United States Patent
Yoshikawa

(10) Patent No.: US 12,273,910 B2
(45) Date of Patent: Apr. 8, 2025

(54) COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Yuki Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 402 days.

(21) Appl. No.: 17/942,268

(22) Filed: Sep. 12, 2022

(65) Prior Publication Data

US 2023/0097269 A1    Mar. 30, 2023

(30) Foreign Application Priority Data

Sep. 24, 2021  (JP) .................................. 2021-156080

(51) Int. Cl.
  *H04W 72/566*  (2023.01)
  *H04L 5/00*  (2006.01)
  *H04W 72/0446*  (2023.01)

(52) U.S. Cl.
  CPC ........... *H04W 72/569* (2023.01); *H04L 5/006* (2013.01); *H04W 72/0446* (2013.01)

(58) Field of Classification Search
  None
  See application file for complete search history.

(56) References Cited

U.S. PATENT DOCUMENTS

| | | | |
|---|---|---|---|
| 9,294,301 B2 * | 3/2016 | Tune | ................. H04L 12/46 |
| 11,424,967 B2 | 8/2022 | Yoshikawa | |
| 11,889,556 B2 * | 1/2024 | Xin | ................. H04W 74/0866 |
| 11,979,773 B2 * | 5/2024 | Jauh | ................. H04W 72/56 |
| 2021/0297189 A1 | 9/2021 | Yoshikawa | |
| 2021/0368506 A1 | 11/2021 | Yoshikawa | |
| 2021/0384943 A1 | 12/2021 | Yoshikawa | |
| 2022/0248465 A1 | 8/2022 | Yoshikawa | |
| 2022/0353113 A1 | 11/2022 | Yoshikawa | |

FOREIGN PATENT DOCUMENTS

JP    2018-050133 A    3/2018

* cited by examiner

*Primary Examiner* — Hong S Cho
(74) *Attorney, Agent, or Firm* — Carter, DeLuca & Farrell LLP

(57) ABSTRACT

A communication apparatus configured to be able to perform multilink communications compliant with an IEEE 802.11 standard using a plurality of links, receives one or more frames transmitted through one or more links from each of a plurality of external apparatuses, discriminates an external apparatus that is a transmission source of the one or more frames based on a parameter included in each of the one or more frames, the discrimination unit discriminating, when two or more frames are received from one of the external apparatuses through two or more different links, the one of the external apparatus as the transmission source of the two or more frames, and decides a priority, in terms of communication connection, for the plurality of external apparatuses based on communication states of the two or more frames.

18 Claims, 10 Drawing Sheets

COMMUNICATION APPARATUS, METHOD FOR CONTROLLING THE SAME, AND STORAGE MEDIUM

BACKGROUND OF THE INVENTION

Field of the Invention

The present invention relates to a communication apparatus, a method for controlling the same, and a storage medium.

DESCRIPTION OF THE RELATED ART

Due to a recent increase in the amount of data communicated, development of communication techniques such as a wireless local area network (LAN) and the like has been advancing. The Institute of Electrical and Electronics Engineers (IEEE) 802.11 series standard has been known as major communication standards for the wireless LAN. The IEEE 802.11 series standard includes standards such as IEEE 802.11a/b/g/n/ac/ax. For example, in IEEE 802.11ax, which is the latest standard, a high peak throughput with the maximum gigabits per second (Gbps) of 9.6, through the use of OFDMA, and in addition, a technique of improving the communication speed wider a congested situation are standardized (see Japanese Patent Laid-Open No. 2018-050133). OFDMA is short for orthogonal frequency-division multiple access.

To achieve an even higher throughput, improvement in frequency use efficiency, and improvement in terms of communication latency, a task group for a successor standard known as IEEE 802.11be has been organized.

For IEEE 802.11be, the use of multilink (Multi-Link) communications has been under consideration. With the multilink communications, a single access point (AP) establishes a plurality of links in frequency bands such as 2.4 GHz, 5 GHz, and 6 GHz bands with a single station (STA), to perform concurrent communication. Communication apparatuses that perform the multilink operation are referred to as multilink devices hereinafter, referred to as MLD). A single MLD has a configuration equivalent to that of a plurality of STAs or a plurality of APs associated with a plurality of respective links.

It has been known that a reachable range of radio waves generally varies depending on the frequency. Specifically, a lower frequency leads to a larger diffraction of radio waves, resulting in a longer reachable distance. On the other hand, a higher frequency leads to a smaller diffraction of radio waves, resulting in a shorter reachable distance, Even if there is an obstacle in between the transmission source and the destination, radio waves with a low frequency can circumvent the obstacle to reach the destination. On the other hand, radio waves with a high frequency travels with high linearity and thus may fail to circumvent the obstacle and reach the destination. Meanwhile, a frequency of 2.4 GHz is often used in other devices. For example, it has been known that a microwave oven emits a radio wave at the same frequency band. As described above, even when radio waves are emitted from a single communication apparatus, the intensity and signal/noise (SN) ratio of transmitted radio waves may vary among frequency bands, depending on the installed location and environment of the communication apparatus. Thus, even when the STA can be connected to the AP that can communicate using a plurality of frequency bands through the multilink communications, the radio field intensity and SN ratio may be compromised in a certain frequency band, and thus communications using a plurality of links may fail to be performed.

SUMMARY OF THE INVENTION

The present invention provides a technique of enabling a communication apparatus that can communicate with external apparatuses through a plurality of links using a plurality of frequency bands, to select an external apparatus suitable as a communication connection target.

According to one aspect of the present invention, there is provided a communication apparatus configured to be able to perform multilink communications compliant with an IEEE 802.11 standard using a plurality of links, the communication apparatus comprising: a receiving unit configured to receive one or more frames transmitted through one or more links from each of a plurality of external apparatuses; a discrimination unit configured to discriminate an external apparatus that is a transmission source of the one or more frames based on a parameter included in each of the one or more frames, the discrimination unit discriminating, when two or more frames are received from one of the external apparatuses through two or more different links, the one external apparatus as the transmission source of the two or more frames; and a deciding unit configured to decide a priority, in terms of communication connection, for the plurality of external apparatuses based on communication states of the two or more frames.

According to another aspect of the present invention, there is provided a method for controlling a communication apparatus configured to be able to perform multilink communications compliant with an IEEE 802.11 standard using a plurality of links, the method comprising: receiving one or more frames transmitted through one or more links from each of a plurality of external apparatuses; discriminating an external apparatus that is a transmission source of the one or more frames based on a parameter included in each of the one or more frames, the discriminating performing discrimination of, when two or more frames are received from one of the external apparatuses through two or more different links, the one external apparatus as the transmission source of the two or more frames; and deciding a priority, in terms of communication connection, for the plurality of external apparatuses based on communication states of the two or more frames.

According to another aspect of the present invention, there is provided a non-transitory computer-readable storage medium storing instructions that, when executed by a computer, cause the computer to perform a method for controlling a communication apparatus configured to be able to perform multilink communications compliant with an IEEE 802.11 standard using a plurality of links, the method comprising: receiving one or more frames transmitted through one or more links from each of a plurality of external apparatuses; discriminating an external apparatus that is a transmission source of the one or more frames based on a parameter included in each of the one or more frames, the discriminating performing discrimination of, when two or more frames are received from one of the external apparatuses through two or more different links, the one external apparatus as the transmission source of the two or more frames; and deciding a priority, in terms of communication connection, for the plurality of external apparatuses based on communication states of the two or more frames.

Further features of the present invention will become apparent from the following description of exemplary embodiments with reference to the attached drawings.

DESCRIPTION OF THE EMBODIMENTS

Figure 1:
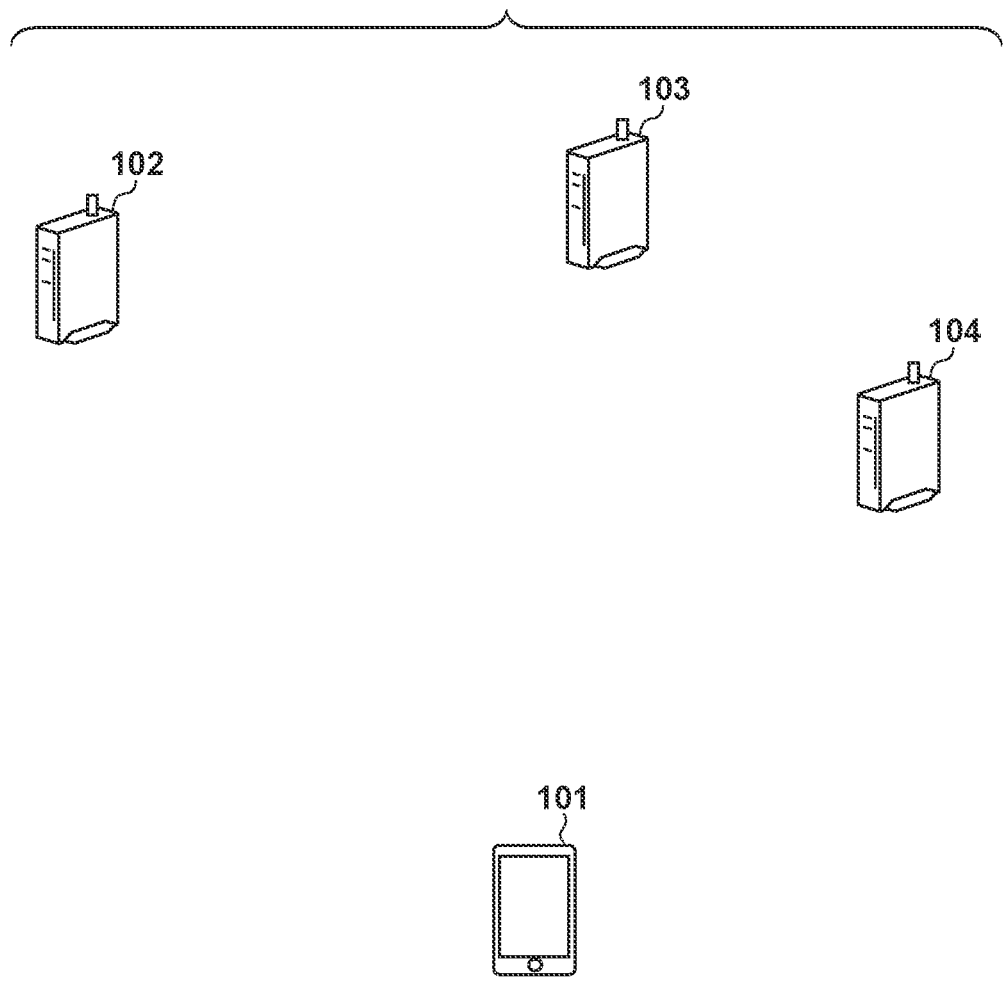
FIG. 1 is a diagram illustrating an example of a network configuration according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Configuration of Wireless Communication System

FIG. 1 illustrates an example of a configuration of a network to which a communication apparatus 101 (hereinafter, referred to as an STA 101) according to the present embodiment is connected. Communication apparatuses 102 to 104 (hereinafter, referred to as an AP 102 to an AP 104) are access points (AP) in charge of establishing a wireless network. The AP 102 to the AP 104 can each communicate with the STA 101. The STA 101 can be connected to the network by establishing communication connection with any of the AP 102 to the AP 104.

Each of the AP 102 to the AP 104 and the STA 101 can conduct wireless communications compliant with the IEEE 802.11be (EHT) standard. Note that IEEE is short for Institute of Electrical and Electronics Engineers. The AP 102 and the AP 103 as well as the STA 101 are multi link devices (MLD) that can perform communications at frequencies in 2.4 Hz, 5 GHz, and 6 GHz bands. In the present embodiment, the AP 104 is assumed to be not supporting the multilink communications. The frequency bands used by each of the communication apparatuses are not limited to the examples described above, and the number of frequency bands is also not limited to three. For example, another different frequency band such as a 60 GHz band may also be usable. The AP 102 to the AP 104 and the STA 101 perform communications using bandwidths of 20 MHz, 40 MHz, 80 MHz, 160 MHz, and 320 MHz. Still, the bandwidths used by each of the communication apparatuses are not limited to these, and other different bandwidths such as 240 MHz and 4 MHz may be used for example.

The AP 102 to the AP 104 and the STA 101 execute OFDMA communications compliant with the IEEE 802.11be standard to implement multi user (MU) communications with which signals of a plurality of users are multiplexed. OFDMA is short for Orthogonal Frequency Division Multiple Access. With the OFDMA communications, parts (resource units (RU)) of the frequency band split are respectively allocated to the STAs without overlapping, and carrier waves of the respective STAs are orthogonal to each other. Thus, an AP can communicate in parallel with a plurality of STAs within a bandwidth defined.

Note that the AP 102 to the AP 104 and the STA 101 which are described to support the IEEE 802.11be standard, may further support legacy standards before the IEEE 802.11be standard. Specifically, the AP 102 to the AP 104 and the STA 101 may support at least one of IEEE 802.11a/b/g/n/ac/ax standards. In addition to the IEEE 802.11 series standards, other communication standards such as Bluetooth (registered trademark), ZigBee, NFC, UWB, MBOA may further be supported. NFC is short for Near Field Communication. UWB is short for Ultra Wide Band, MBOA is short for Multi Band OFDM Alliance. UWB includes wireless USB, wireless 1394, WiNET, and the like. The AP 102 to the AP 104 and the STA 101 may further support a communication standard for wired communication such as wired LAN. Specific examples of the AP 102 to the AP 104 include, but are not limited to, wireless LAN routers, personal computers (PC), and the like. Furthermore, the AP 102 to the AP 104 may be information processing apparatuses such as a wireless communication chip that can conduct wireless communications compliant with the IEEE 802.11be standard. Specific examples of the STA 101 include, but are not limited to, cameras, tablets, smart phones, PCs, mobile phones, video cameras, headsets, and the like. Furthermore, the STA 101 may be an information processing apparatus such as a wireless communication chip that can conduct wireless communications compliant with the IEEE 802.11be standard.

The AP 102, the AP 103, and the STA 101 execute multilink communications with a plurality of links established through a plurality of frequency channels. According to the IEEE 802.11 series standards, the bandwidth of each frequency channel is defined as 20 MHz. This frequency channel is a frequency channel defined in the IEEE 802.11 series standards. A plurality of frequency channels are respectively defined for frequency bands of 2.4 GHz, 5 GHz, 6 GHz, and 60 GHz in the IEEE 802.11 series standards. A bandwidth that is equal to or greater than 40 MHz may be used in a single frequency channel, through bonding between adjacent frequency channels.

For example, the AP 102 and the STA 101 can perform communications using a link established through a first frequency channel of a 2.4 GHz band. In parallel with the communications described above, the AP 102 and the STA 101 can also perform communications using a link established through a second frequency channel of a 6 GHz band. In this case, the STA 101 and the AP 102 execute multi link communications, with the second link through the second frequency channel and the first link through the first frequency channel both maintained. In this manner, the STA 101 and the AP 102 establish a plurality of links through a plurality of frequency channels, so that the communication throughput can be improved. In the present embodiment, the first link provided by the AP 102 is provided with the link number 1, and operates in 6 ch and at 20 MHz in the 2.4 GHz band. The second link provided by the AP 102 is provided with the link number 2, and operates in 113 ch and at 320 MHz in the 6 GHz band.

Similarly, the AP 103 is assumed to operate with a link that is provided with the number 3 and operates in 6 ch and at 20 MHz in the 2.4 GHz band, with a link that is provided with the number 4 and operates in 36 ch and at 80 MHz in the 5 GHz band, and with a link provided with the number 5 and operates in 252 ch and at 320 MHz in the 6 GHz band. The AP 104 is assumed to operate in 44 ch and at 80 MHz in the 5 GHz band, and to not perform multilink operations. The AP 102, the AP 103, and the AP 104 are assumed to operate with the SSIDs set to "Bacardi", "pudding", and "PommedeEve2", respectively. It is also assumed that other APs are in the periphery of the STA 101. Note that the SSIDs of the AP 102 to the AP 104 may be the same.

In the present embodiment, the maximum number of links that can be supported by the STA 101 is assumed to be two. Still, the number of links in different frequency hands established to be used for the multilink communications may be more than two. For example, the STA 101 may be able to establish a link in each of 2.4 GHz, 5 GHz, and 6 GHz bands, and may be able to establish links through a plurality of different channels included in a single frequency band. For example, it may be able to establish a 6 ch link in a 2.4 GHz band as a first link, and in addition further establish a 1 ch link in a 2.4 GHz as a second link. A plurality of links in the same frequency band and links in different frequency bands may coexist. For example, the STA 101 may be able to establish a 6 ch link in the 2.4 GHz band, a 1 ch link in the 2.4 GHz band, and a 149 ch link in the 5 GHz band. The STA 101 as well as the AP 102 and the AP 103 can establish a plurality of connections in different frequency bands, meaning that even if one band is congested, communications involving the STA 101 can be performed in another band. Thus, decrease in throughput and delay can be suppressed for the communication with the STA 101.

While three APs and a single STA are used in the wireless network illustrated as an example in FIG. 1, it is a matter of course that the number and arrangement of APs and STA are not limited to this. For example, one more STA may be added to the wireless network in FIG. 1. The frequency band of each link established, the number of links, the bandwidth, and the like are not limited.

For example, with the multilink communications, single piece of data is split and transmitted to partner apparatuses, for example the AP 102 and the STA 101, through a plurality of links. Under this condition, the AP 102 and the STA 101 may be able to execute Multiple-Input and Multiple-Output (MIMO) communications. In this case, the AP 102 and the STA 101 include a plurality of antennae, and the transmission side transmits different signals through respective antennae using the same frequency channel. The reception side simultaneously receives all of the signals reached through a plurality of streams using the plurality of antennae, and separates and decodes the signals corresponding to the respective streams With the MIMO communications performed in this manner, the AP 102 and the STA 101 can communicate a larger amount of data within the same amount of time, than in a case where the MIMO communications are not performed. When performing the multilink communications, the AP 102 and the STA 101 may execute the MIMO communications using some of the plurality of links.

Configuration of AP and STA

Figure 2:
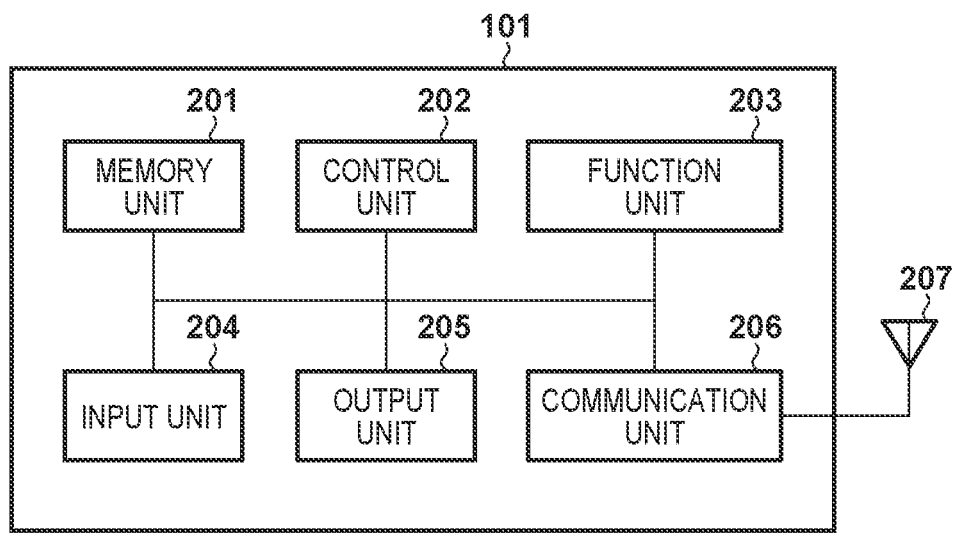
FIG. 2 is a block diagram illustrating a hardware configuration example of a communication apparatus according to the first embodiment.

FIG. 2 illustrates an example of a hardware configuration of the STA 101 according to the present embodiment. The STA 101 includes a memory unit 201, a control unit 202, a function unit 203, an input unit 204, an output unit 205, a communication unit 206, and an antenna 207. There may be a plurality of the antennae 207. The AP 102 to the AP 104 have the same hardware configuration as the STA 101.

The memory unit 201 is constituted by one or more memory such as a ROM and/or a RAM, and stores various types of information such as computer programs for performing various operations described below and communication parameters for wireless communication. ROM is short for Read Only Memory, and RAM is short for Random Access Memory. Note that, in addition to a memory such as a ROM and a RAM, a storage medium such as a flexible disk, a hard disk, an optical disc, a magneto-optical disc, a CD-ROM, a CD-R, a magnetic tape, a non-volatile memory card, or a DVD may be used as the memory unit 201.

For example, the control unit 202 is constituted by one or more processors, such as a CPU and an MPU, and controls the STA 101 as a whole by executing computer programs stored in the memory unit 201. Note that the control unit 202 may control the STA 101 as a whole through cooperation between an Operating System (OS) and a computer program stored in the memory unit 201. The control unit 202 generates data and a signal (wireless frame) transmitted through communications with other communication apparatuses. Note that CPU is short for a Central Processing Unit, and MPU is short for a Micro Processing Unit. The control unit 202 may include a plurality of processors such as a multi-core processor, to control the STA 101 as a whole using the plurality of processors. The control unit 202 may control the function unit 203 to execute a predetermined process such as wireless communications, imaging and printing, and projection. The function unit 203 is hardware for the STA 101 to execute a predetermined process.

An input unit 204 accepts various operations from a user. The output unit 205 provides various outputs to the user, using a monitor screen and a speaker. Here, the output from the output unit 205 may be display on the monitor screen, audio output from the speaker, vibration output, and the like. Note that both the input unit 204 and the output unit 205 may be implemented in one module, such as a touch panel. The input unit 204 and the output unit 205 may each be integrated with or may be provided separately from the STA 101.

The communication unit 206 controls wireless communications compliant with the IEEE 802.11be standard. The communication unit 206 may control wireless communications compliant with other IEEE 802.11 series standards in addition to the IEEE 802.11be standard, or control wired communications using a wired LAN or the like. The communication unit 206 controls the antenna 207 to transmit, to an external device, signals for wireless communications generated by the control unit 202, and to receive signals transmitted from the external device. The antenna 207 is an antenna with which communications can be performed in 2.4 GHz, 5 and 6 GHz bands. In the present embodiment, the STA 101 includes one antenna, but may include a plurality of antennae. Furthermore, the STA 101 may include antennas respectively for different frequency bands. When the STA 101 includes a plurality of antennae, the communication units 206 corresponding to each of the antennae may be provided.

When the STA 101 supports an NFC standard, Bluetooth standard, and the like, in addition to the IEEE 802.11be standard, the communication unit 206 may control wireless communications compliant with these communication standards. When the STA 101 can conduct wireless communications compliant with a plurality of communication standards, for each of the communication standards, the STA 101 may individually include the communication unit 206 and the antenna 207. The STA 101 communicates data such as image data, document data, and video data to an external communication apparatus through the communication unit 206. The antenna 207 may be configured as a member provided separately from the communication unit 206, or may be configured as a single module in combination with the communication unit 206.

Figure 3:
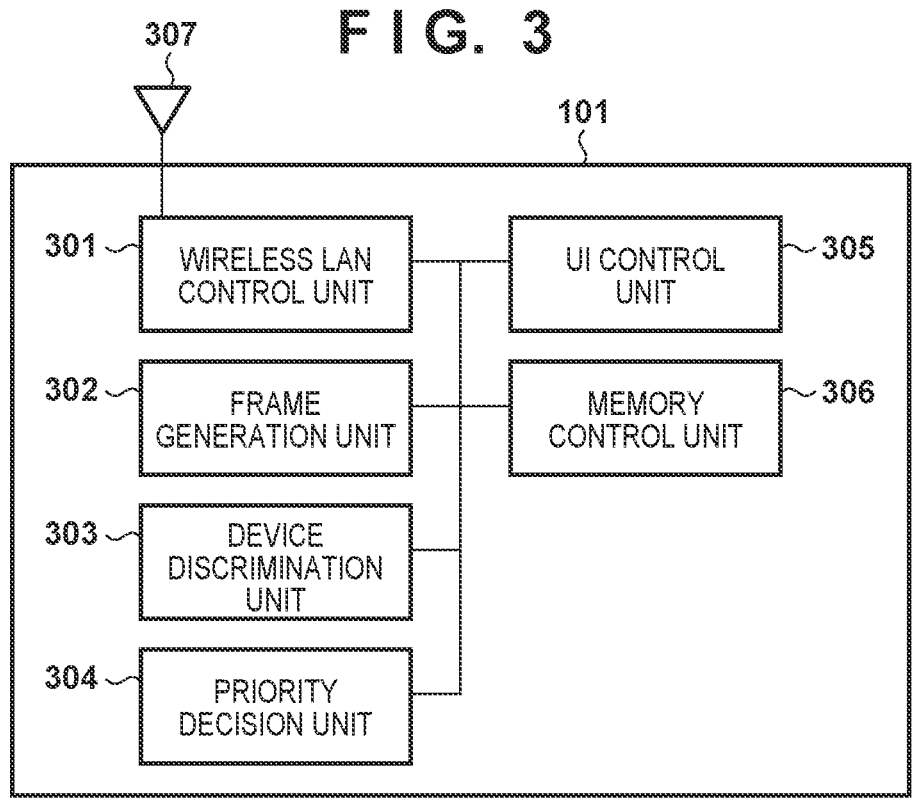
FIG. 3 is a block diagram illustrating a functional configuration example of the communication apparatus according to the first embodiment.

FIG. 3 is a block diagram illustrating a functional configuration example of the STA 101 according to the present embodiment. As illustrated in FIG. 3, the STA 101 includes a wireless LAN control unit 301, a frame generation unit 302, a device discrimination unit 303, a priority decision unit 304, a UI control unit 305, a memory control unit 306, and a radio antenna 307.

The wireless LAN control unit 301 includes an antenna and a circuit configured to transmit and receive radio signals to and from another communication apparatus with which wireless LAN communications are performed, as well as a program for controlling these. The wireless LAN control unit 301 execute control of the wireless LAN communications based on a frame generated by the frame generation unit 302, in accordance with the IEEE 802.11 series standard. Note that the number of wireless LAN control units 301 is not limited to one, and there may be a plurality of the wireless LAN control units 301. The frame generation unit 302 generates the frame for the wireless control, transmitted from the wireless LAN control unit 301. The contents of the frame generated by the frame generation unit 302 may be constrained by settings stored in the memory unit 201, or may be changed based on the settings made by the user on the UI control unit 305. The frame thus generated is supplied to the wireless LAN control unit 301, and transmitted to the communication counterpart through the radio antenna 307.

The device discrimination unit 303 discriminates the transmission source (external communication apparatus) of each of a plurality of respective frames received, based on a parameter included in each of the plurality of frames received by the wireless LAN control unit 301. When two or more frames are received through two or more different links from a single external apparatus, the device discrimination unit 303 may discriminate that the transmission source of these two or more frames is the single external apparatus. The priority decision unit 304 decides priority for communications with the external apparatus, based on the result of the discrimination by the device discrimination unit 303 and the communication state (meta information such as the radio field intensity and SN ratio) of the frame received by the wireless LAN control unit 301. The UI control unit 305 displays, using the output unit 205, a list of communication apparatuses that are connection candidates, based on the priority thus decided.

The UI control unit 305 includes hardware related to user interface such as a touch panel or a button configured to receive an operation from the user of the STA 101, and a program for controlling the same. The UI control unit 305 also has a function of displaying an image or the like, or presenting information such as an audio output to the user, for example. The memory control unit 306 controls writing and reading of various types of information to and from the memory unit 201.

Flow of Processing

Figure 4:
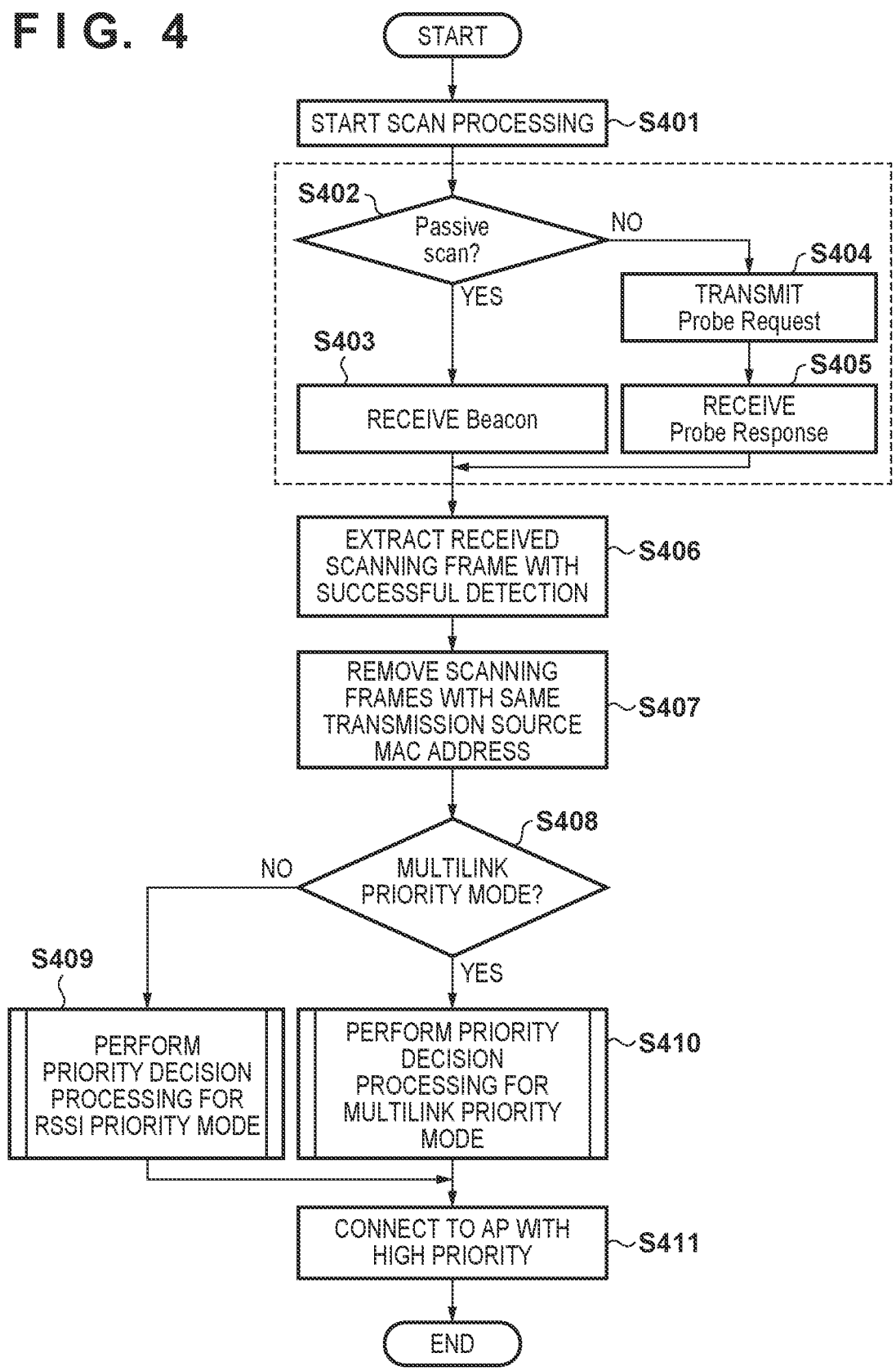
FIG. 4 is a flowchart of decision processing of a priority according to the first embodiment.

Now, a description will be given on a flow of processing of deciding a priority for the communication apparatuses (APs) that are connection candidates, executed by the STA 101 having the configuration described above, in the wireless communication system of the present embodiment. FIG. 4 is a flowchart illustrating a flow in which the STA 101 searches for APs, decides the priority for the APs that are the connection candidates, and establishes the communication connection to an AP with a high priority. The wireless LAN control unit 301 can perform the multilink communications, and can also communicate using the 2.4 GHz band only, the 5 GHz band only, or the 6 GHz band only. Note that the effect of the present embodiment is not compromised even when communications cannot be performed in any of these frequency bands. The wireless LAN control unit 301 may be able to perform communications in a frequency band other than the frequency bands described above.

Figure 8:
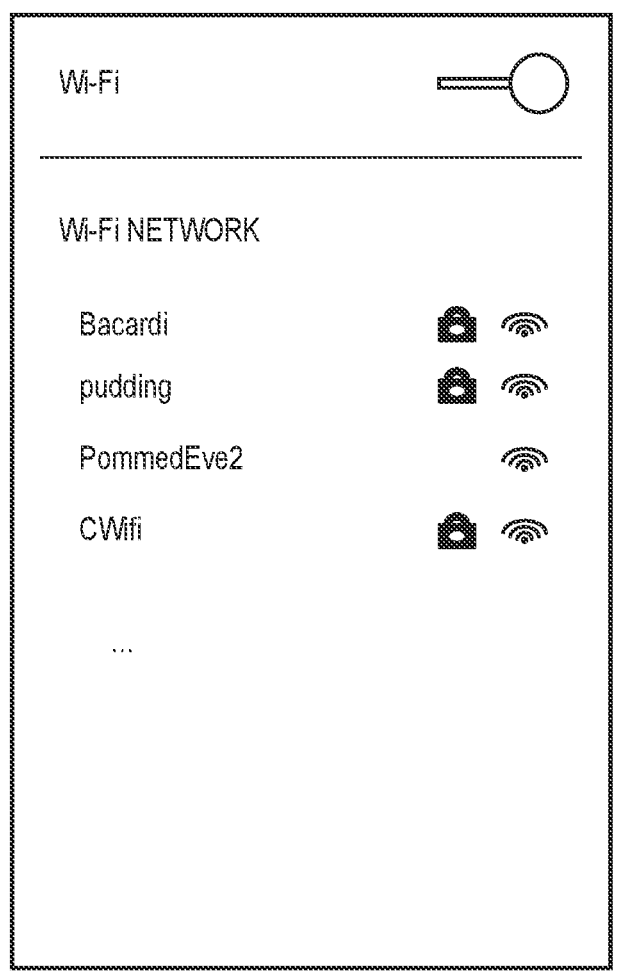
FIG. 8 is a diagram illustrating an example of a graphical user interface display.

The AP 102, the AP 103, and the AP 104 may operate with the same SSID and password, or may operate with different SSIDs and passwords. When a plurality of APs operate with the same SSID and password, the processing illustrated in FIG. 4 can be used for deciding the priority for the APs that are the connection candidates in roaming processing fix reconnecting the AP that has been disconnected. In a system where a single network is formed by a plurality of APs, the STA 101 executes the processing of deciding the priority for the connection candidate APs, and establishes connection with the AP with the highest priority. On the other hand, when a plurality of APs operate with different SSIDs and passwords, the STA 101 executes the processing illustrated in FIG. 4 when displaying a result of scan processing to the user. In this case, the STA 101 decides the priority for the APs, and then displays a list of connectable APs in order of the priority decided through the processing in FIG. 4, for example, as illustrated in FIG. 8 described below. For example, when the user selects an AP from the list, the STA 101 establishes the communication connection with the AP thus selected.

The processing illustrated in the flowchart in FIG. 4 starts when the STA 101 searches for a network. However, the start of the processing illustrated in FIG. 4 is not limited to this. For example, the processing illustrated in FIG. 4 may start when an AP operating in the STA 101 starts, or when Peer-to-Peer (P2P) starts. Alternatively, the processing illustrated in FIG. 4 may start when the value of the radio field intensity or the SN ratio from the AP connected is compromised, or when the quality of the communication data is compromised. For example, the processing illustrated in FIG. 4 may start when a frequency of occurrence of error bit exceeds a threshold.

The wireless LAN control unit 301 of the STA 101 starts the scan processing by an AP connection instruction, a Wi-Fi function start instruction, or a scan instruction from the user, or may automatically execute the scan processing periodically (S401). The type of scan processing includes Passive scan and Active scan. When the scan processing is the Passive scan (YES in S402), the wireless LAN control unit 301 receives Beacon transmitted from an AP in the periphery (S403).

On the other hand, when the type of scan processing is the Active scan (NO in S402), the wireless LAN control unit 301 transmits a Probe Request in each frequency band (S404), and receives a Probe Response from the AP (S405). A Beacon and a Probe Response are generally referred to as management frames, but these frames received in the scan processing are hereinafter referred to as scanning frames. The STA 101 can obtain information on the AP in the periphery, based on information provided to the scanning frame (that is, Beacon or Probe Response) received as described above. The scan processing (processing in S402 to S405, surrounded by the dashed line) is executed for a predetermined period of time. Information on the APs in the periphery of the STA 101 is collected through reception of the scanning frame within this period.

When the scan processing ends, the device discrimination unit 303 extracts from the scanning frames received, a frame with successful detection (S406). Or in S406, only the AP with the SSID matching that used for the search and a security method satisfying a condition may be selected. The device discrimination unit 303 searches for the scanning frame with the matching transmission source address (MAC address) When there are a plurality of scanning frames with the matching transmission source address, the device discrimination unit 303 keeps any one of the scanning frames and discards the other scanning frames (S407). Any method can be used for deciding the scanning frame to remain among the plurality of scanning frames with the matching transmission source address. For example, a scanning frame first received may remain, or a scanning frame with the largest amount of information may remain. Alternatively, a scanning frame provided with an element related to a multilink may remain. In the present embodiment, a plurality of scanning frames transmitted from a single AP through a plurality of links with different frequency bands are assumed to have different transmission source addresses. However, this should not be construed in a limiting sense, and the same transmission source address (MAC address) may be used for a plurality of scanning frames transmitted from a single AP through a plurality of links with different frequency bands. In this case in S407, the device discrimination unit 303 does not discard the scanning frames received through links with different frequency bands, even when the scanning frames have the same transmission source address.

When the sorting of the received scanning frames as described above is completed, processing of deciding the priority for the APs (S408 to S410) starts.

First of all, the priority decision unit 304 determines whether to use a method of giving a higher priority to an AP supporting multilink (hereinafter, referred to as a multilink priority mode), as a method of deciding the priority for the APs for selecting an AP to be a connection target (S408). The multilink priority mode is used, for example, when communications with small delay is required. Possible cases of such an application requiring small delay include remote operation, AR, VR, action game, and the like. Alternatively, for example, the multilink priority mode is selected also when a large amount of data is required to be communicated within a short period of time, such as cases of AR and VR. Furthermore, the AP is preferably selected under the multi-link priority mode, also when the communications require stability, such as a case where wireless LAN is provided for stores in a mall and a case where wireless LAN is used in homes. When the multilink priority mode is not selected, a method of deciding the priority for the APs prioritizing the communication state is used. In the present embodiment, it is assumed that a method of prioritizing an AP with a high Received Signal Strength Indicator (RSSI), i.e., reception radio field intensity, is used (hereinafter, referred to as an RSSI priority mode). The RSSI priority mode may be selected in a case where the connection target AP needs to be optimized, such as a case where the wireless LAN is used in facilities such as an airport and university, for example. Under the RSSI priority mode, connection to an AP with a higher radio wave intensity means connection to an AP with a shorter physical distance. Thus, interference and congestion involving other STAs and APs can be prevented. Note that the selection of the multilink priority mode or the RSSI priority mode is made through, for example, a user operation.

When the multilink priority mode is selected (YES in S408), the priority decision unit 304 performs the priority decision processing to decide the priority with the multilink AP prioritized (S410). A flow of priority decision processing under the multilink priority mode in S410 will be described below with reference to a flowchart in FIGS. 6A and 6B. On the other hand, when the RSSI priority mode is selected (NO in S408), the priority decision unit 304 performs the priority decision processing under the RSSI priority mode (S409). A flow of priority decision processing under the RSSI priority mode in S409 will be described below with reference to a flowchart in FIGS. 7A and 7B. When the priority for the AP connection is set in S409 or S410, the wireless LAN control unit 301 attempts to establish the wireless communication connection with the AP with the highest priority (S411).

Figure 6A:
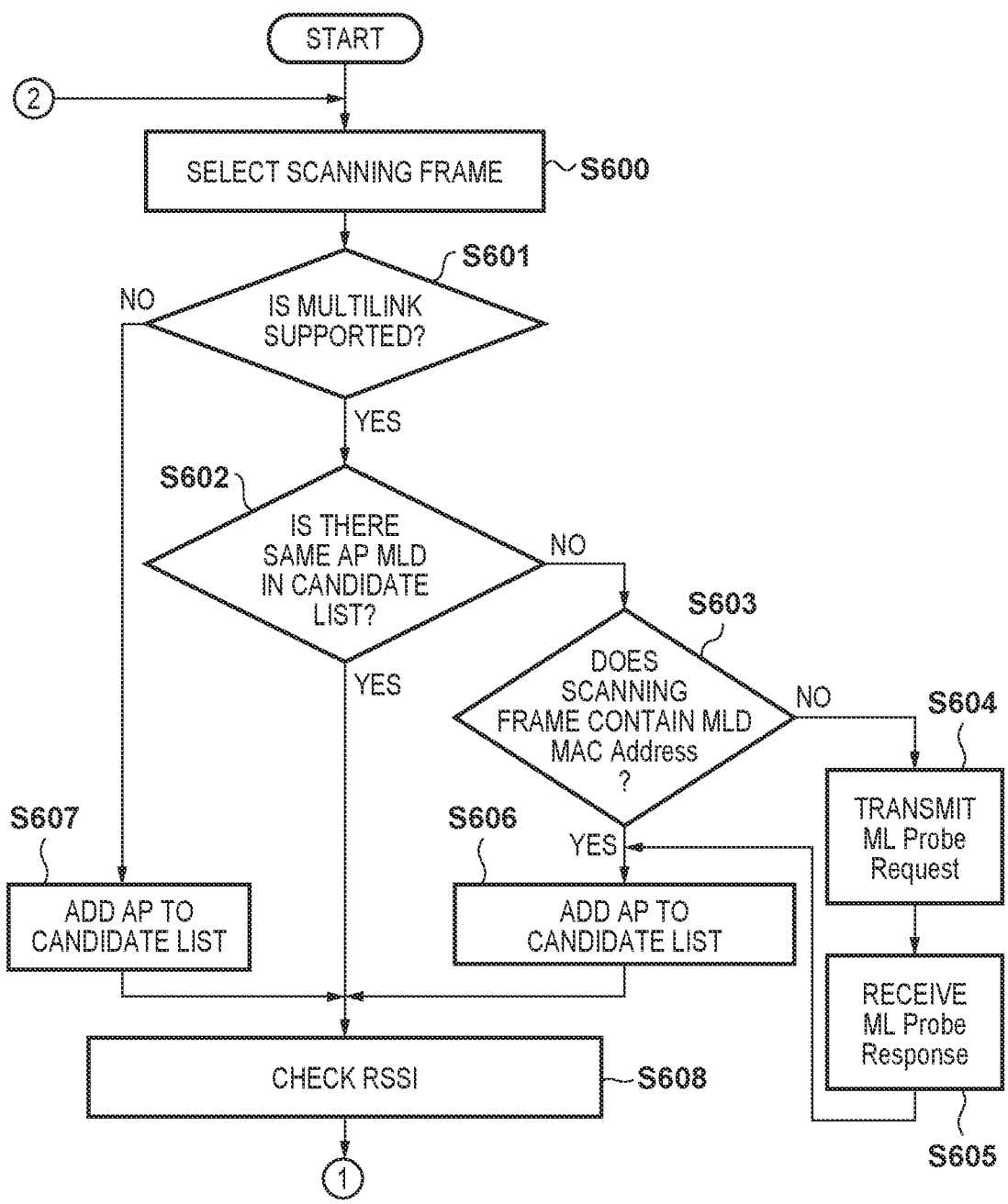
FIG. 6A and FIG. 6B are a flowchart illustrating decision processing of a priority under a multilink priority mode.
Figure 6B:
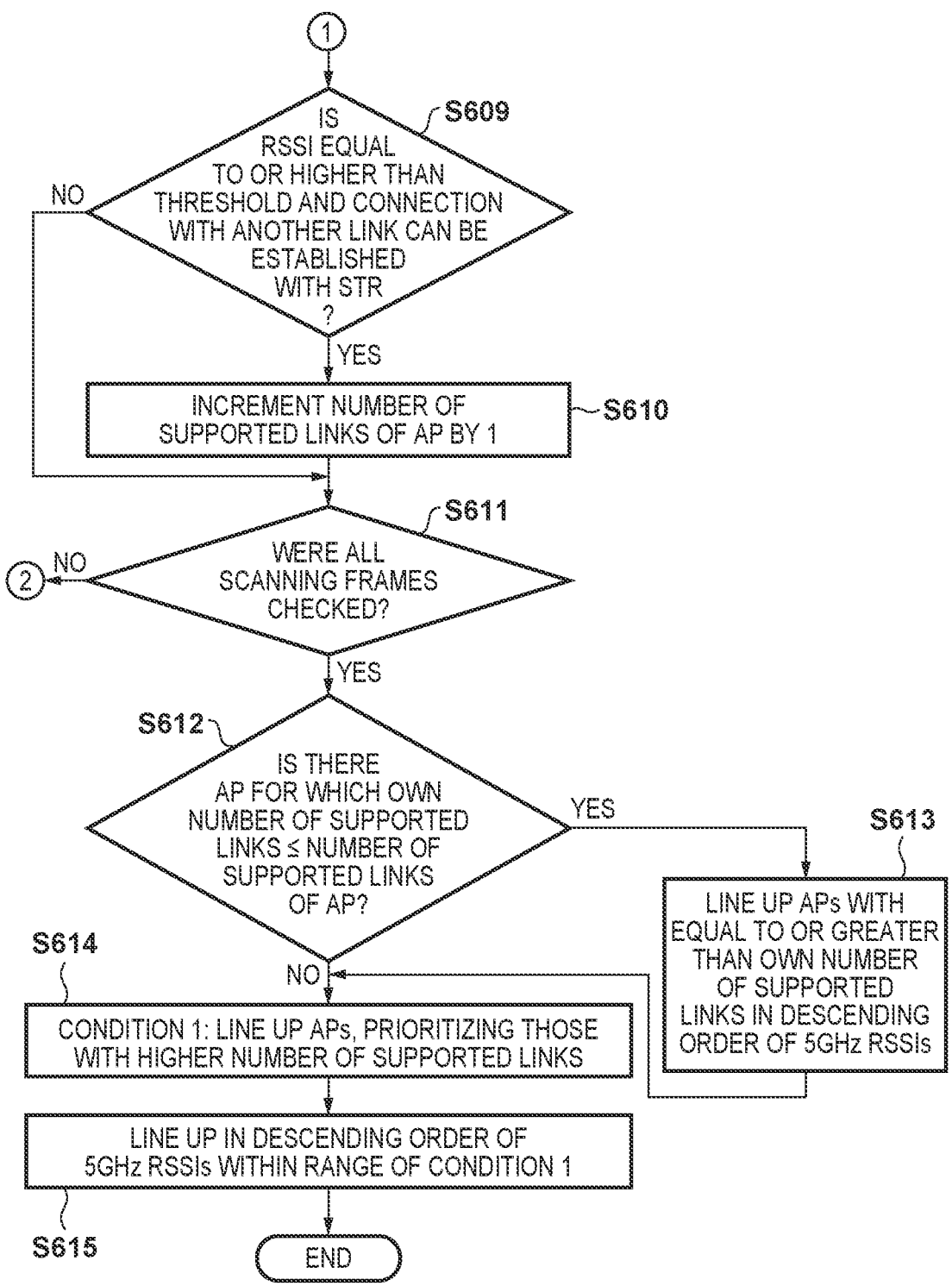

Next, the priority decision processing under the multilink priority mode will be described in detail with reference to the flowchart in FIGS. 6A and 6B. The processing illustrated in FIGS. 6A and 6B corresponds to a subroutine executed in S410 in FIG. 4. The priority decision unit 304 sequentially selects the scanning frames extracted in S407, and decides the priority for the selected scanning frames.

The device discrimination unit 303 selects one from a group of scanning frames remaining after the processing in S407 (S600), and checks whether the communication apparatus that is the transmission source of the scanning frame selected is the AP supporting the multilink communications (S601). The AP supporting the multilink communications is hereinafter also referred to as "multilink supporting AP". A specific method of checking whether the transmission source AP supports the multilink includes determining whether an ML element is provided to the frame received. The ML element includes information on multilink, and thus eliminates the need for a separately prepared field indicating the multilink capability. As another example, a bit indicating whether the multilink is supported may be prepared in an Extended Capability element provided to the scanning frame, and whether the AP supports the multilink may be determined based on whether the bit is set. In this case, the ML element does not necessarily need to be provided to the scanning frame, whereby whether the multilink is supported can be indicated while keeping the size of the scanning frame small.

When the transmission source of the scanning frame selected is judged to not support the multilink (NO in S601), the device discrimination unit 303 adds the AP of the transmission source of the scanning frame selected to the candidate list as a new AP candidate (S607). On the other hand, when the AP of the transmission source of the scanning frame selected is judged to support the multilink (YES in S601), the processing proceeds to S602 and after. The device discrimination unit 303 checks whether the candidate APs already recorded in the candidate list include an AP MLD that is the same as the AP of the transmission source of the scanning frame currently selected (S602). Note that the AP MLD is the multilink supporting AP.

When checking with a scanning frame received through another link indicates that the AP of the transmission source of the scanning frame selected has been recorded in the candidate list, the device discrimination unit 303 judges that the candidate list includes the AP MLD that is the same as the AP of the transmission source. For example, when the transmission source address of the scanning frame selected matches any of a plurality of MAC addresses corresponding to a plurality of links of candidate APs recorded in the candidate list, the AP of the transmission source is determined to have been checked. When the AP of the transmission source of a scanning frame corresponds to a plurality of links in a plurality of frequency bands, the scanning frame includes information on MAC Addresses in other links. In S606 described below, when a new AP is added to the candidate list, the MAC Address of another link is recorded, in addition to the MAC Address of the transmission source of the scanning frame. The device discrimination unit 303 refers to the MAC Addresses of the candidate APs recorded in the candidate list, and judges whether there is a candidate AP including the MAC Address matching the transmission source address of the scanning frame. Thus, whether the candidate list includes the AP that is the same as the AP as the transmission source of the scanning frame can be judged.

Furthermore, whether the candidate list includes the same AP may be checked depending on whether the ML element is provided, and MLD MAC Addresses of candidate APs listed in the candidate list include the MLD MAC Address included in the ML element provided. In this case, the checking may be performed through comparison between MLD MAC Addresses when there are the MLD MAC Addresses, and may be performed through comparison between MAC addresses as described above if there are no MLD MAC Addresses. Note that in S602, an MLD SSID (see FIG. 5) included in the ML element may be used instead of or in addition to the MLD MAC Address. Additionally, as described with reference to S407, a configuration may be employed in which when a single AP uses a plurality of links with different frequency bands, the same MAC Address can be used for the plurality of links. In such a case, the device discrimination unit 303 may judge whether the candidate list includes an AP that is the same as the AP as the transmission source of the scanning frame, depending on whether the candidate list includes the AP with the MAC Address matching the transmission source address of the scanning frame selected. Note that it suffices that, whether the AP is the MLD can be judged with any of the plurality of links. Thus, even if whether the AP is the MLD cannot be judged with the current scanning frame, when the AP can be related to the same MLD with a scanning frame from another link later on, the recording in the candidate list can be updated at that point. When it is judged that the candidate list includes the AP MLD that is the same as the AP as the transmission source of the scanning frame as described above (YES in S602), the processing proceeds to S608.

On the other hand, when it is judged that the candidate list does not include the AP MLD that is the same as the AP of the transmission source of the scanning frame (NO in S602), the processing proceeds to S603. When the AP of the transmission source of the scanning frame selected is the AP MLD (supports multilink) (YES in S601) and is not included in the candidate list (NO in S602), S603 to S606 are executed.

Figure 5:
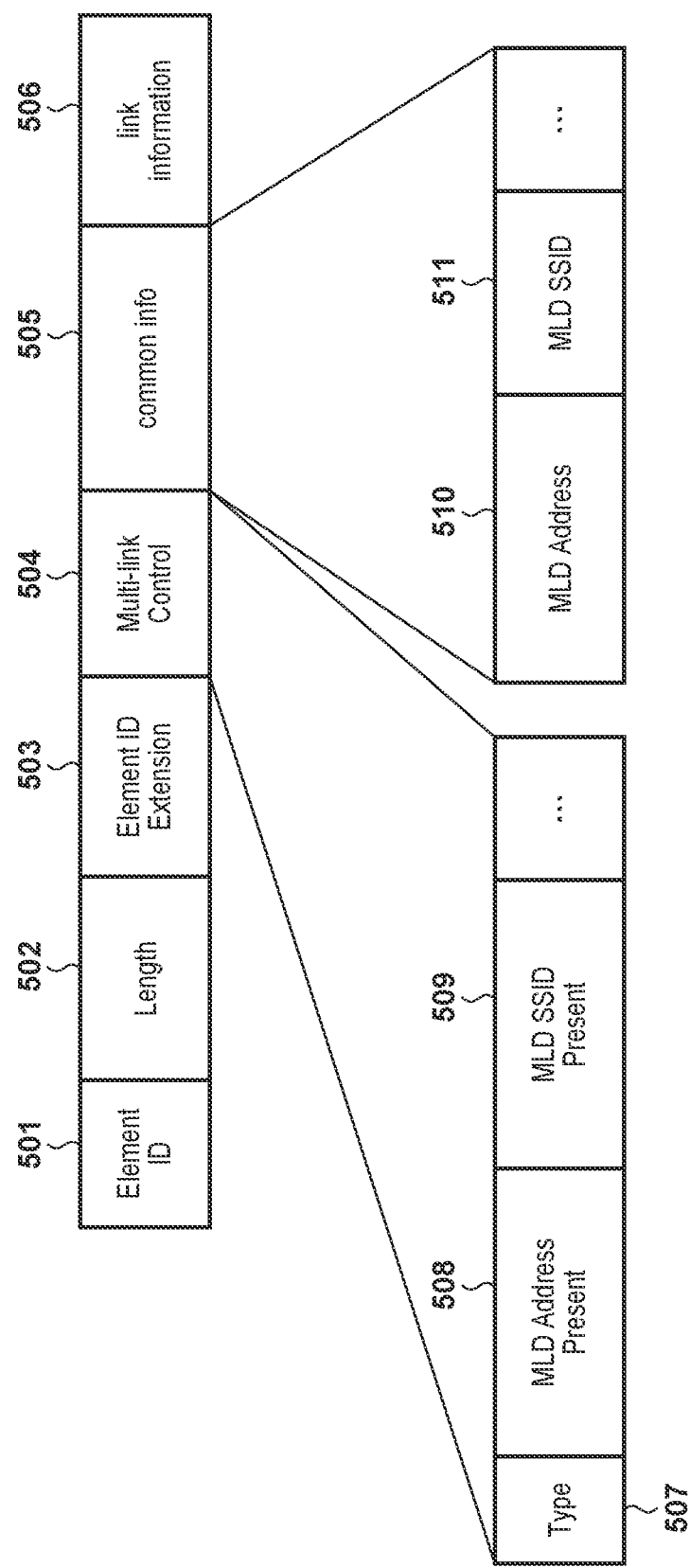
FIG. 5 is a diagram illustrating an example of an element provided in accordance with a multilink operation.

Now a description will be given on the ML element. The ML element is provided to the scanning frame transmitted by the AP 102 and the AP 103, or to an ML Probe Response described below. FIG. 5 is a diagram illustrating an example of a data configuration of the ML (multilink) element that is one type of Element defined in IEEE 802.11. The ML element is formed by fields including, from the top, an Element ID field 501, a Length field 502, an Element ID Extension field 503, a Multi-Link Control field 504, a common info field 505, and a link information field 506. The Element ID field 501 and the Element ID Extension field 503 in combination indicate that the element is the ML element. In the present example, in case of the ML element, the values of the Element ID field 501 and the Element ID Extension field 503 are assumed to be 255 and 94, respectively. However, other values may be used.

The Multi-Link Control field 504 includes a Type subfield 507, an MLD Address Present subfield 508, and an MLD SSID Present subfield 509. The Type Subfield 507 is for defining the format of the common info field 505 and the link information field 506 subsequent to the Type Subfield 507. The MLD Address Present subfield 508 indicates whether the subsequent common info field 505 includes the MED MAC Address. The MLD SSID Present subfield 509 indicates whether the subsequent common info field 505 includes the MLD SSID.

The subfield included in the common info field 505 varies depending on the value of the Multi-Link Control field 504. Here, the common info field 505 is assumed to include an MLD Address subfield 510 and an MLD SSID subfield 511. The MLD Address subfield 510 indicates a six octets address (MLD MAC Address) allocated to each transmission source MLD. The communication apparatus that has received frames through multilink, can determine based on this address, which frames, among the frames, have been transmitted from the same MLD.

Referring back to FIG. 6A, when the judgment in S602 described above is NO, the device discrimination unit 303 determines whether the scanning frame selected includes the MLD MAC Address (S603). When the MLD MAC Address is determined not to be included (NO in S603), the processing proceeds to S604. The device discrimination unit 303 transmits an ML Probe Request to the AP of the transmission source of the scanning frame (S604), and receives an ML Probe Response from the AP (S605). Then, the AP of the transmission source of the scanning frame selected is added to the candidate list as a new AP MLD (S606). In this process, the device discrimination unit 303 records the MAC Address, the MLD MAC Address, and the MAC Address of the link with another frequency band in the candidate list, as the information on the AP of the transmission source. Note that the transmission and the reception of an ML Probe Request and an ML Probe Response in S603 and S604 in FIG. 6A may be omitted. In this case, an AP that has transmitted the scanning frame including no MLD MAC Address is regarded as an AP with a plurality of links individually operating, even if the AP supports multilink. Alternatively, when the link information field 506 (FIG. 5) for another frame includes the MLD MAC Address of the target AP, the scanning frame may be regarded as the scanning frame transmitted through one of the plurality of links of the AP MLD. When the judgment in S602 is performed using the MLD MAC Address, the processing in S603 to S605 may be executed before S602, to increase the possibility of successful acquisition of the MLD MAC Address as much as possible.

When the checking on the AP of the transmission source of the scanning frame selected ends as described above, the priority decision unit 304 checks the RSSI or the SN ratio for the scanning frame received (S608). The RSSI and the SN ratio are measured when the scanning frame is received, and are managed in association with each scanning frame.

When the same AP MLD is included in the candidate list, the priority decision unit 304 checks whether the link of the scanning frame that has been checked and the link of the scanning frame selected correspond to STR (S609). STR is short for Simultaneous transmit and receive. When a plurality of links correspond to STR, it means that frames can be transmitted and received simultaneously through the plurality of links. On the other hand, when a plurality of links correspond to Non STR (NSTR), it means that transmission/reception of a frame in one link imposes limitation on transmission/reception of a frame in another link. For example, when a plurality of links operate in the same channel, while a frame is being transmitted/received through one link, a frame cannot be transmitted/received through another link. When frequencies of two links are close, while a frame is being transmitted through one link, a frame may be transmittable through another frame but may not be receivable therethrough.

When it is judged that a condition is satisfied such that the value of the RSSI exceeds a threshold and connection between links can be established with STR (YES in S609), the priority decision unit 304 increments the number of links that can be supported by the transmission source AP by one (S610). When it is judged that the above condition is not satisfied (NO in S609), the number of links that can be supported by the transmission source AP is not incremented. Note that the condition may include any one of or a plurality of "RSSI is equal to or higher than the threshold", "SN ratio is equal to or higher than the threshold", and "whether SIR is enabled." Alternatively, the condition for the STR (a threshold for closeness in frequency between links for determining whether STR is enabled for example) may be changed depending on the values of the RSSI and the SN ratio. Alternatively, the thresholds for the RSSI and the SN ratio may be changed depending on whether the SR is enabled. In this manner, the priority decision unit 304 controls count of the number of links that can be supported by the AP based on the communication state of the scanning frame (based on the RSSI or the SN ratio in the present embodiment). Note that the STR enabled may mean that any one of "STA (the apparatus itself) can perform STR" and "AP (partner apparatus) can perform STR" or both when two links are established.

For the AP recorded in the candidate list, the number of supported links may be categorized and held. For example, for each AP in the candidate list, the number of supported links, the number of links with which the AP can comfortably perform communications, and the number of links with which the AP can perform SIR may be recorded. The value of each of these categories may be referred to for deciding the priority in processing in S613 to S615 described below. For example, for the threshold used in S609, the reception radio field intensity at a level enabling reception by the STA 101 may be used. Alternatively, the reception radio field intensity at a level enabling comfortable communication after the connection may be used for the threshold.

The priority decision unit 304 checks whether the processing described above has been executed on all of the scanning frames remaining as a result of the processing in S407 (S611). The priority decision unit 304 repeats the processing in S601 to S611, until the processing described above is performed on all of the scanning frames (until the result of the judgment in S611 becomes NO).

When the checking on all of the scanning frames received ends (YES in S611), the number of links supported by each candidate AP in the candidate list is determined. Next, the priority decision unit 304 decides the priority of the candidate APs recorded in the candidate list for communication connection (S612 to S615). First of all, the priority decision unit 304 checks whether the candidate list includes a candidate AP the number of supported links of which is equal to or larger than the number of supported links of the STA 101 (S612). When there is one or more such candidate APs (YES in S612), the priority decision unit 304 decides the priority to make the one or more candidate APs lined up in the descending order of the RSSI (or the descending order of the SN ratio) (S613). Then, the processing in S614 and after is performed on the candidate APs (the APs the number of supported links of which is smaller than the number of links of the STA 101), in the candidate list, for which the priority has not been decided yet. On the other hand, when the candidate list does not include the candidate AP the number of supported links of which is equal to or larger than the number of supported links of the STA 101 (NO in S612), the processing of giving priority in S614 and after is performed on all of the candidate APs in the candidate list.

For the candidate APs in the candidate list for which the priority has not been determined yet, the priority decision unit 304 decides the priority to the candidate APs in the descending order of the number of supported links (S614). In this process, when there are a plurality of candidate APs with the same number of supported links, the priority decision unit 304 decides the priority to make those candidate APs lined up in the descending order of the RSSI (or of the SN ratio) (S615). For the RSSI or the SN ratio in S613 and S615, the RSSI or the SN ratio in a certain frequency band is used. The certain frequency band is assumed to be the 5 GHz band in the present embodiment. However, this should not be construed in a limiting sense, and the 6 GHz band or the 2.4 GHz band may be used for example. Furthermore, the RSSI (SN ratio) to be compared is not limited to that in the specific frequency hand, and may be, for example, an average value or a median value of the RSSIs (SN ratios) obtained for a plurality of frequency bands. In this case, a scanning frame from a link with the RSSI or the SN ratio higher than a threshold may be checked, or all of the scanning frames received for the AP MLD may be checked. In this manner, the priority is decided for all of the candidate APs. Note that if the purpose of the present processing is reconnection, the connection to the AP with the highest priority may be initiated, at the timing when this AP is decided, that is, before the priority is decided for all of the APs.

As described above, in FIGS. 6A and 6B, the reception state (reception radio field intensity, SN ratio) is checked for all of the scanning frames associated with a plurality of links of a single candidate AP, and then the priority is set for the connection candidate APs.

In the processing example described above, a reference is made on the reception state of the scanning frame at the time of reception, the processing may be performed while considering the number of links with which the reception state at a predetermined level or higher (the reception radio field intensity or the SN ratio that is equal to or higher than a threshold) can be guaranteed after the connection has been established. With such a configuration, high throughput and low delay can be achieved after the connection to the AP selected based on the priority has been established.

Next, a specific flow of the processing under the RSSI priority mode in which the priority is decided for the APs prioritizing the reception radio field intensity (S409 in FIG. 4) will be described with reference to FIGS. 7A and 7B. In the processing in FIGS. 7A and 7B, the priority is decided through the following schematic steps (1) to (3). In the following description, the reception radio field intensity (RSSI) is used as the communication state of the scanning frame. However, the SN ratio may be used, or the RSSI and the SN ratio may both be taken into consideration.

(1) The APs are lined up in the descending order of the reception radio field intensity (RSSI) of the scanning frame. The order for the APs transmitting a plurality of scanning frames is decided using the RSSI of the scanning frame with the highest RSSI, among the scanning frames. Thus, the APs are lined up, with the scanning frames, each of which is the scanning frame with the highest RSSI among the scanning frames of which transmission source is the same AP, being in the descending order of RSSI.

(2) When a difference in RSSI between the scanning frames transmitted from two adjacent APs of the APs listed in (1) is not larger than a threshold, one of these two APs that supports multilink is decided to have a higher priority than the other one.

(3) When the two APs in (2) both support multilink, the priority is decided with reference to the RSSI in the scanning frame received through another link.

Under the RSSI priority mode, the processing will be performed on all of the AP of the transmission sources of the scanning frames extracted through the processing up to S407. The processing illustrated in FIGS. 7A and 7B involves unchecked AP, AP of interest, next candidate AP, and recorded AP that is recorded in a priority list. The unchecked AP is an AP, among the APs of the transmission sources of the scanning frames extracted, for which the priority has not been decided yet. All of the APs are the unchecked APs at the beginning. The priority decision unit 304 extracts, from the unchecked APs, APs with the highest and the second highest RSSIs as the AP of interest and the next candidate AP respectively, decides the priority, and records the APs in the priority list.

The APs become the recorded APs once they are recorded in the priority list.

First of all, the priority decision unit 304 lines up the scanning frames received, in the order of RSSI (S701). Next, the priority decision unit 304 selects the AP of the transmission source of the scanning frame with the highest RSSI, as the AP of interest (S702). The priority decision unit 304 checks whether the AP of interest supports multilink, is provided with the ML element, and the ML element includes information on another link and MLD MAC Address (S703). Whether the AP of interest supports multilink is checked by the method described above. When the AP of interest supports multilink but the MLD MAC Address is not included, the priority decision unit 304 transmits an ML Probe Request to the AP of interest (S704). The priori decision unit 304 receives an ML Probe Response from the AP of interest (S705), and obtains the above-described information such as the MLD MAC Address. The processing of transmitting and receiving an ML Probe Request and an ML Probe Response (S704 and S705) are not essential processing. When S704 and S705 are omitted, an AP that has transmitted the scanning frame including no MLD MAC Address is regarded as an AP with a plurality of links individually operating even if the AP supports multilink. When the link information field 506 in FIG. 5 includes the MLD MAC Address of the target AP in another scanning frame received, the scanning frame may be regarded as a frame being transmitted through one link corresponding to the AP MLD.

After the information on the AP of interest has been collected, the priority decision unit 304 checks whether an unchecked AP other than the AP of interest remains (S706). When there is no unchecked AP other than the AP of interest (NO in S706), the processing proceeds to S717. When there is an unchecked AP other than the AP of interest (YES in S706), the priority decision unit 304 selects, as the next candidate AP, the AP of the transmission source of the scanning frame received with the highest RSSI among the unchecked APs other than the AP of interest (S707). The priority decision unit 304 checks whether the next candidate AP supports multilink, is provided with the ML element, and the ML element includes information on another link and MLD MAC Address (S708). When the next candidate AP supports multilink but the information on another link or the MLD MAC Address is not included (NO in S708), the priority decision unit 304 transmits an ML Probe Request to the next candidate AP (S709), The priority decision unit 304 receives an ML Probe Response from the next candidate AP (S710), and obtains the above-described information. Note that the processing in S709 and S710 are not essential processing. When the processing in S709 and S710 are omitted, the next candidate AP that is transmission source of the scanning frame including no MLD MAC Address is regarded as the individually operating AP even if the AP supports multilink. Alternatively, when the link information field 506 in FIG. 5 includes the MAC Address of the target AP in another frame received, the scanning frame may be regarded as a frame being transmitted through one link corresponding to the AP MLD.

Then, the priority decision unit 304 compares the RSSI in the scanning frame received from the AP of interest with the RSSI in the scanning frame received from the next candidate AP (S711). When the difference between the RSSIs is not larger than the threshold (YES in S711), the priority decision unit 304 checks whether the AP of interest and the next candidate AP support multilink (S712). When only one of the AP of interest and the next candidate AP supports multilink (YES in S712), the priority decision unit 304 sets the AP supporting multilink as the AP of interest (S713), and repeats the processing in S706 and after. This means that no change is made when the AP of interest supports multilink, but the next candidate AP is newly set to be the AP of interest when the next candidate AP supports multilink. In this case, the AP that was the AP of interest is temporarily excluded from the unchecked AP, meaning that processing thereon is suspended.

The judgment in S712 being NO indicates that both the AP of interest and the next candidate AP support multilink or neither of them supports multilink. The priority decision unit 304 checks whether the AP of interest and the next candidate AP both support multilink (S714). When neither of the APs supports multilink (NO in S714), the priority decision unit 304 compares the RSSIs of the scanning frames received, and sets the AP of the transmission source of the scanning frame with a higher RSSI to be the AP of interest (S715). In this case, the AP of interest is not changed, and thus S715 may be omitted. When both APs support multilink (YES in S714), the priority decision unit 304 compares the RSSIs of the scanning frames each having the second highest RSSI among scanning frames of which transmission source is one of the AP of interest and the next candidate AP. The priority decision unit 304 sets the transmission source of the scanning frame determined to have the higher RSSI as a result of the comparison between the second highest RSSIs to be the AP of interest (S716), and repeats the processing in S706 and after. When a difference between the second highest RSSIs is also smaller than the threshold, comparison may be performed with the scanning frames having the third highest RSSIs. Alternatively, the RSSIs in the scanning frames may be acquired until the number of links reaches that is supportable by the STA 101, and the AP of interest may be selected using the average value of the RSSIs. Alternatively, of the AP of interest and the next candidate AP, one with a larger number of supported links may be set to be the AP of interest, without performing the comparison in RSSI. As in S713, when the AP of interest is changed, the AP that was the AP of interest is temporarily excluded from the unchecked AP, meaning that processing thereon is suspended.

On the other hand, when the difference between the RSSIs exceeds the threshold in S711 (NO in S711) or when there is no unchecked AP other than the AP of interest in S706 (NO in S706), the processing proceeds to S717. In this case, the priority decision unit 304 decides the AP, among the unchecked. APs, with the highest priority to be the AP of interest, and the AP is recorded in the priority list (S717). Accordingly, the AP of interest becomes the recorded AP, and thus is no longer the unchecked AP.

Then, the priority decision unit 304 checks whether all of the APs of the transmission sources of the scanning frames received have been recorded in the priority list (S718). In this process, when there is the AP the processing for which has been suspended as a result of a change in the AP of interest in S713 or S716, the priority decision unit 304 sets such APs back to the unchecked APs, and then judges whether there is an unchecked AP not recorded in the priority list. When there is an unchecked AP (NO in S718), the priority decision unit 304 selects, as the AP of interest, the AP of the transmission source of the scanning frame with the highest RSSI among the unchecked APs, and repeats the processing from S703 and after. Accordingly, all of the APs of the transmission sources of all of the scanning frame successfully received are recorded in the priority list in accordance with the priority. Note that if the purpose of the processing is reconnection, at the timing when the AP with the highest priority in the priority list is first set, that is, before the AP priority list is completed, the connection to the AP may be initiated.

Figure 7A:
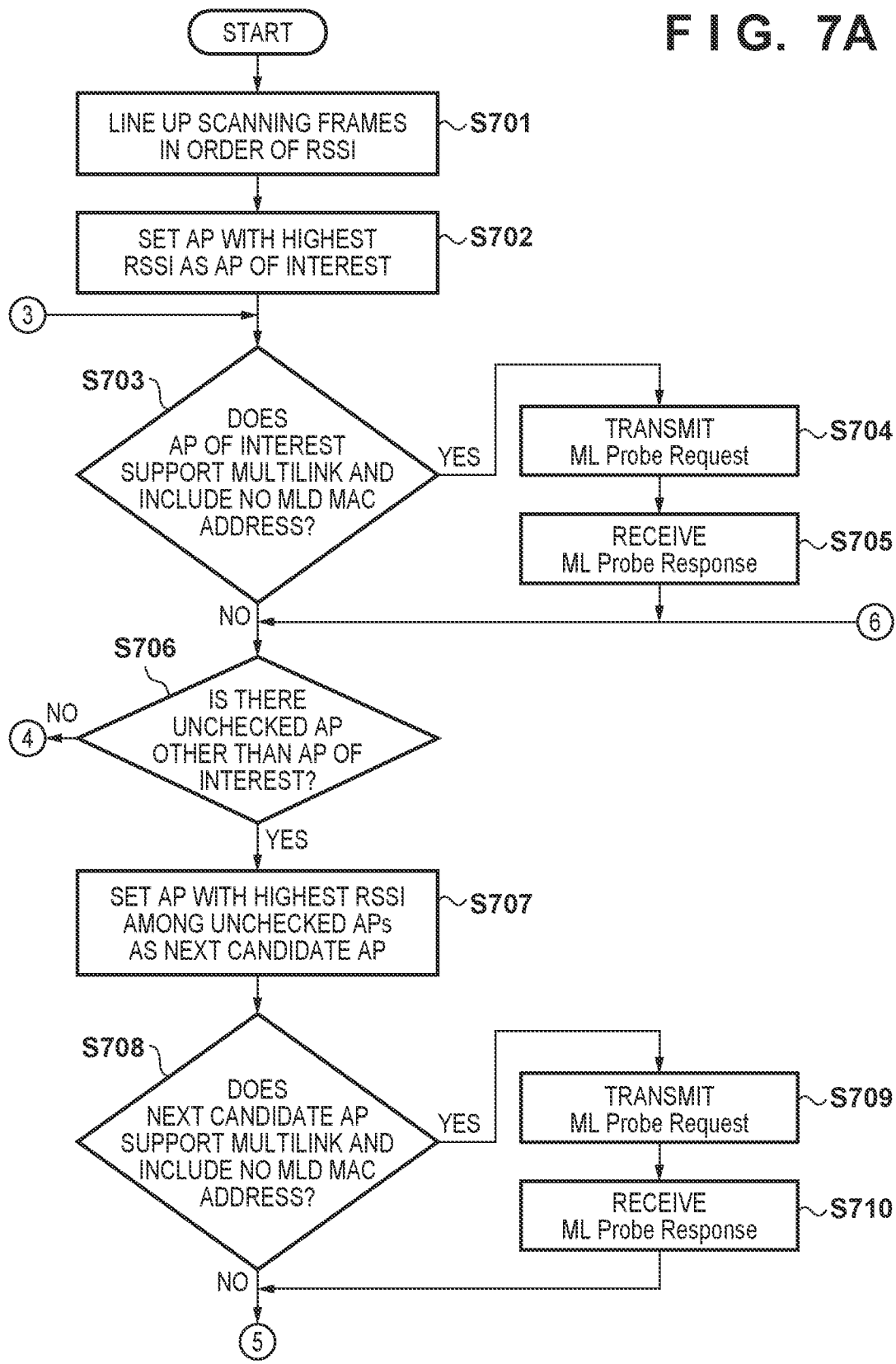
FIG. 7A and FIG. 7B are a flowchart illustrating decision processing of a priority under an RSSI priority mode.
Figure 7B:
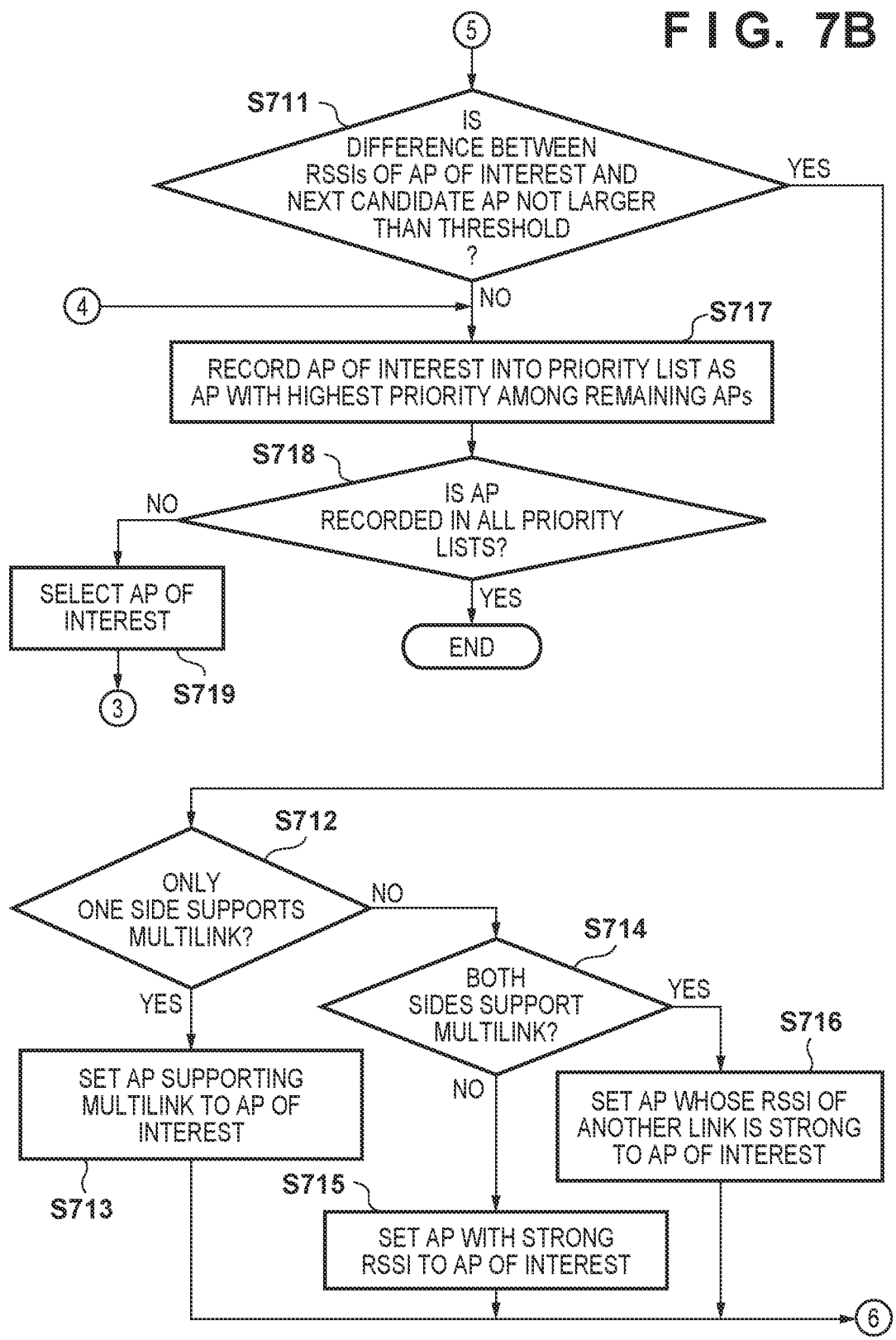

Note that the processing under the RSSI priority mode may be processing of simply giving priority in accordance with the RSSI in the received link, instead of the processing in FIGS. 7A and 7B. In such a case, in S411, connection is attempted on the AP of the transmission source of the scanning frame with the highest RSSI among all of the links. The priority decision processing described with reference to FIGS. 6A and 6B and FIGS. 7A and 7B may be performed in response to a scan instruction involving no connection. In this case, in response to the scan instruction, a list in which the APs are lined up in accordance with the priority is displayed. For example, an AP with a higher priority is displayed closer to the top, and an AP with a lower priority is displayed closer to the bottom.

FIG. 8 illustrates an example of how APs, for which the priority has been decided through the processing in FIG. 4, are displayed to the user. For example, the RSSI of each link of the AP 102 is assumed to be −35 dBm for link 1, and −37 dBm for link 2. The RSSI of each link of the AP 103 is assumed to be −29 dBm for link 3, −48 dB n for link, and −78 dB n for link 5. The RSSI of the AP 104 is assumed to be −36 dBm. When the priority is provided through the priority decision processing (multilink priority mode) illustrated in FIGS. 6A and 6B with the threshold used in S609 in FIG. 6B being −45 dBm, a list including the AP 102, the AP 103, and the AP 104 in this order is obtained. On the other hand, when the priority is provided through the priority decision processing (RSSI priority mode) in FIGS. 7A and 7B, a list including the AP 103 the AP 102, and the AP 104 in this order is obtained. The list of APs is displayed on a UI screen with the APs in order of priority as described above. Alternatively, the SSID of an AP with which connection has been established once may be displayed at the top, and those of other APs may be displayed at the second and below in accordance with the priority set through the processing in FIGS. 6A and 6B or FIGS. 7A and 7B. The STA 101 may display the connection candidates in order of priority on a GUI as illustrated in FIG. 8, in accordance with the priority being set. Furthermore, connection may be attempted one by one from the AP with the highest priority.

Second Embodiment

In the first embodiment described, before connection of AP, the RSSI or the SN ratio of a connection target is checked, and then connection is established or the AP list is displayed. In a second embodiment, an example of processing is described where reconnection is established after the connection.

Figure 9:
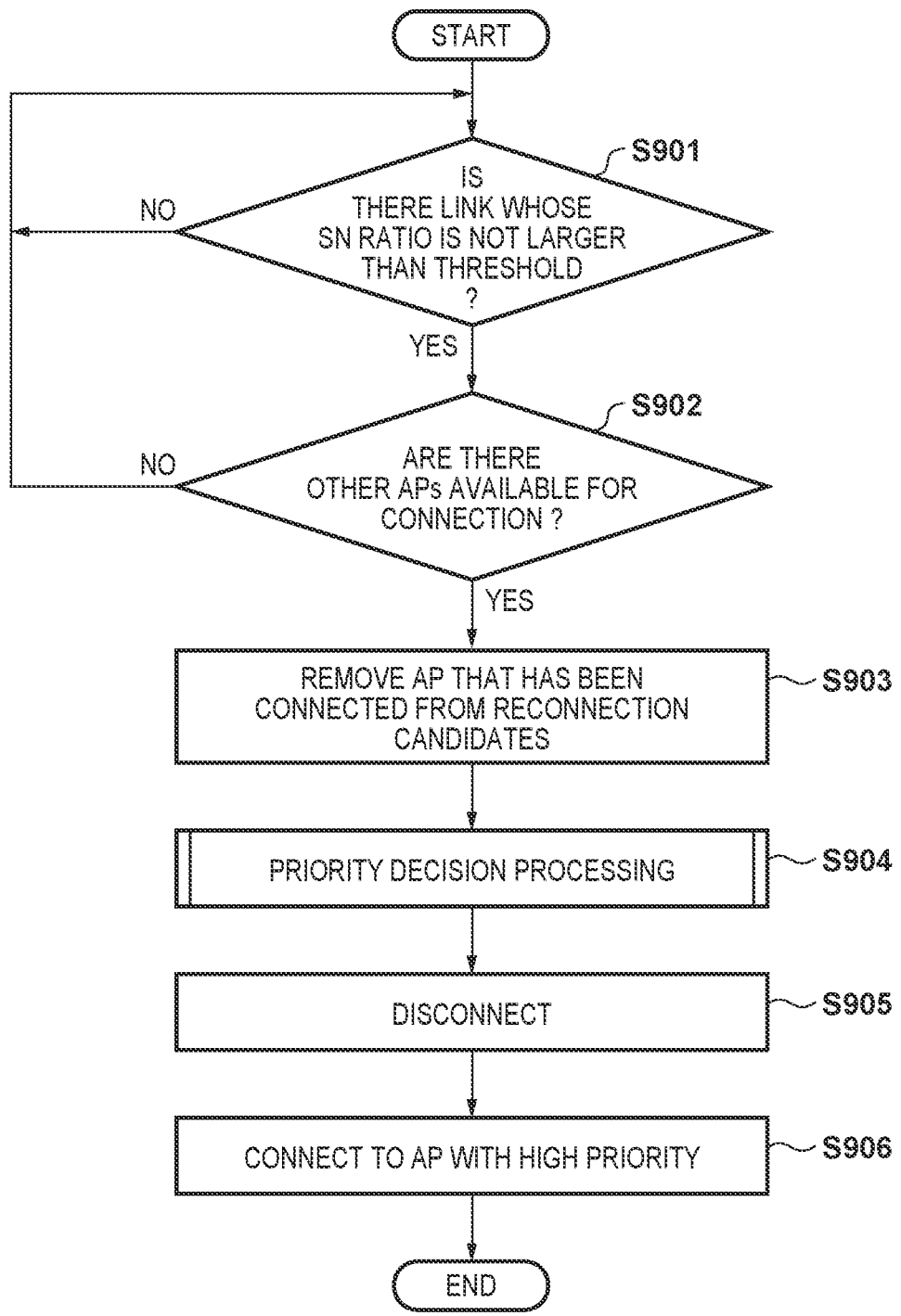
FIG. 9 is a flowchart illustrating reconnection processing according to a second embodiment.

FIG. 9 is a flowchart illustrating a flow of processing (hereinafter, reconnection processing) performed when an SN ratio of any of a plurality of links used for communication connection to the AP 103 established by the STA 101 is low, to establish reconnection with another AP. After the connection with the AP 103 has been established, the wireless LAN control unit 301 checks whether there is a link the SN ratio of which has dropped to or below a threshold, among the plurality of links used for the communications (multilink communications) (S901). Thus, the wireless LAN control unit 301 judges whether the reconnection processing is required. The judgment on whether the reconnection processing is required is not limited to that based on the SN ratio, and may be judged based on the RSSI of the scanning frame received from the AP 103 for example. Furthermore, whether the reconnection processing is required may be judged by detecting a link with a throughput lower than a threshold, a link with delay longer than a threshold, or a link with a transmission data error larger than a threshold. Furthermore, the number of links that can be established by the STA 101 and the AP 103 and the actual number of links successfully established may be taken into consideration for determining whether the reconnection processing is required. For example, it may be determined that the reconnection processing is required when despite the fact that the STA 101 can establish three links, only a single link has been actually established with the AP 103. Alternatively, it may be determined that the reconnection processing is required when SN ratio or throughput drops in two or more of the three links established with the AP 103 by the STA 101.

When the reconnection processing is determined to be required (YES in S901), the wireless LAN control unit 301 checks whether there is another connection candidate AP. When there is no other APs to be the connection candidates, the connection with the currently connected AP 103 is maintained. When there are other APs to be the connection candidates (YES in S902), the AP connected is excluded from the reconnection candidates (S903). Then, the priority decision unit 304 performs the priority decision processing on the connection candidate APs excluding the currently connected AP (S904). Here, it is assumed that the AP 102 is selected as the AP with the highest priority. The priority decision processing may be the processing described in the first embodiment (FIGS. 6A and 6B or FIGS. 7A and 7B), or may be processing of simply selecting one with a high reception radio field intensity in a single link. Once the AP with the highest priority is decided through the priority decision processing, the wireless LAN control unit 301 disconnects communications with the currently connected AP (S905). In the present embodiment, the connection with the AP 103 is disconnected. Then, the wireless LAN control unit 301 connects to the AP judged to have the highest priority in S904 (S906). Here, the connection with the AP 102 is established as described above.

Although it has been described that the AP connected is excluded from the reconnection candidates in S903, the priority decision processing may be performed with the connected AP included in the reconnection candidates. When the connected AP 103 is decided as the AP with the highest priority (decided to be the reconnection target AP), for example, as a result of performing the priority decision processing with the connected AP included, S905 and S906 may be omitted.

The second embodiment described above is effective in a case where a radio wave environment changes or the like due to a movement of the STA 101 after establishing connection with a certain AP. Furthermore, the reconnection processing is automatically performed in response to detection of degradation of a radio wave environment for part of a plurality of links used for the communications, whereby the communication downtime of the STA 101 can be reduced. The processing of the present embodiment may be used also in a case where a multilink supporting AP is transmitting the scanning frame through only a single link. Specifically, after the STA 101 has started the multilink communications with an AP connected based on the radio wave intensity in a certain link, the connection with this AP may be disconnected and reconnection to another AP may be performed depending on the radio wave status in other links. With this configuration, a high quality communication environment is expected to be achieved.

As described above, in each of the above-described embodiments, the appropriate AP can be selected and communications can be performed, even when the communication state varies among each frequency band.

Note that, in each of the above described embodiments, the STA 101 establishes connection with one AP at a time. However, the connection may be established with a plurality of APs at once. For example, the link 1 may be connected to the AP 102, and the link 2 may be connected to the AP 103. Such a configuration may be employed when the AP from which the radio waves can be received with the highest intensity varies among frequency bands supported by the STA 101.

With the present invention, it becomes possible for a communication apparatus that can communicate with external apparatuses through a plurality of links using a plurality of frequency bands to select an external apparatus suitable as the communication connection target.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer max comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplar y embodiments. The scope of the following claims is to be accorded the broadest interpretation so as to encompass all such modifications and equivalent structures and functions.

This application claims the benefit of Japanese Patent Application No. 2021-156080, filed Sep. 24, 2021, which is hereby incorporated by reference herein in its entirety.

What is claimed is:

1. A communication apparatus configured to be able to perform multilink communications compliant with an IEEE 802.11 standard using a plurality of links, the communication apparatus comprising:
a receiving unit configured to receive one or more frames transmitted through one or more links from each of a plurality of external apparatuses;
a discrimination unit configured to discriminate an external apparatus that is a transmission source of the one or more frames based on a parameter included in each of the one or more frames, the discrimination unit discriminating, when two or more frames are received from one of the external apparatuses through two or more different links, the one of the external apparatus as the transmission source of the two or more frames; and
a deciding unit configured to decide a priority, in terms of communication connection, for the plurality of external apparatuses based on communication states of the two or more frames.

2. The communication apparatus according to claim 1, wherein the deciding unit decides the priority, based on number of frames with a reception radio field intensity r an SN ratio being equal to or higher than a threshold, among frames discriminated that a transmission source is a same external apparatus.

3. The communication apparatus according to claim 2, wherein the deciding unit decides the priority, to make external apparatuses, in which number of the frames is equal to or larger than number of links used for multilink communications by the communication apparatus, be lined up in descending order from higher reception radio field intensity in a predetermined frequency band.

4. The communication apparatus according to claim 2, wherein the deciding unit decides the priority, to make external apparatuses, in which number of the frames is smaller than number of links used for multilink communications by the communication apparatus, be lined up in descending order from larger number of frames.

5. The communication apparatus according to claim 4, wherein the deciding unit decides the priority, to make external apparatuses with a same number of the frames, among the external apparatuses in which number of the frames is smaller than the number of links used for multilink communications by the communication apparatus, be lined up in descending order from higher reception radio field intensity in a predetermined frequency band.

6. The communication apparatus according to claim 1, wherein the deciding unit decides the priority, based on number of frames received through a link through which transmission and reception can be performed simultaneously, among frames discriminated that a transmission source is a same external apparatus.

7. The communication apparatus according to claim 1 further comprising a judgment unit configured to judge whether each of the plurality of external apparatuses supports multilink communications, based on a result of the discrimination of the transmission source by the discrimination unit, wherein
the deciding unit
decides the priority for the plurality of external apparatuses to make frames, each being a frame with highest reception radio field intensity among frames of which transmission source is a same external apparatus, be lined up in order of the intensity, and
decides, when a difference in the reception radio field intensity between frames received from two external apparatuses adjacent in the priority is equal to or smaller than a threshold, the priority for the two external apparatuses based on whether the multilink communications are supported.

8. The communication apparatus according to claim 7, wherein when the difference is equal to or smaller than the threshold, the deciding unit decides the priority to be higher for one of the two external apparatuses that supports the multilink communications, than the priority for another one of the two external apparatuses.

9. The communication apparatus according to claim 7, wherein when the difference is equal to or smaller than the threshold and the two external apparatuses both support the multilink communications, the deciding unit decides the priority for the two external apparatuses based on comparison between reception radio field intensities of frames, each being a frame with a second highest reception radio field intensity or lower among frames of which transmission sources are respectively the two external apparatuses.

10. The communication apparatus according to claim 1 further comprising a connection unit configured to attempt establishment of communication connection with the external apparatuses in descending order from higher priority decided by the deciding unit.

11. The communication apparatus according to claim 1 further comprising:
a determination unit configured to determine whether reconnection processing is required based on a communication state of each of a plurality of links established with another communication apparatus; and
a reconnection unit configured to, when the reconnection processing is determined to be required, disconnect communications with the other communication apparatus, and execute connection processing with one of the plurality of external apparatuses based on the priority decided by the deciding unit.

12. The communication apparatus according to claim 11, wherein the determination unit determines whether the reconnection processing is required based on whether a plurality of frames received through the plurality of links from the other communication apparatus include at least one of a frame with an SN ratio lower than a threshold, a frame with an RSSI lower than a threshold, and a frame with a communication throughput lower than a threshold.

13. The communication apparatus according to claim 11, wherein the reconnection unit attempts establishment of communication connection with the external apparatuses in descending order from higher priority decided by the deciding unit.

14. The communication apparatus according to claim 1 further comprising a display unit configured to display a list of the plurality of external apparatuses in order of the priority decided by the deciding unit.

15. The communication apparatus according to claim 1, wherein the militia communications are compliant with IEEE 802.11.

16. The communication apparatus according to claim 1, wherein the frame is a Beacon or a Probe Response compliant with IEEE 802.11.

17. A method for controlling a communication apparatus configured to be able to perform multilink communications compliant with an IEEE 802.11 standard using a plurality of links, the method comprising:
receiving one or more frames transmitted through one or more links from each of a plurality of external apparatuses;
discriminating an external apparatus that is a transmission source of the one or more frames based on a parameter included in each of the one or more frames, the discriminating performing discrimination of, when two or more frames are received from one of the external apparatuses through two or more different links, the one external apparatus as the transmission source of the two or more frames; and
deciding a priority, in terms of communication connection, for the plurality of external apparatuses based on communication states of the two or more frames.

18. A non-transitory computer-readable storage medium storing instructions that, when executed by a computer, cause the computer to perform a method for controlling a communication apparatus configured to be able to perform multilink communications compliant with an IEEE 802.11 standard using a plurality of links, the method comprising:
receiving one or more frames transmitted through one or more links from each of a plurality of external apparatuses;
discriminating an external apparatus that is a transmission source of the one or more frames based on a parameter included in each of the one or more frames, the discriminating performing discrimination of, when two or more frames are received from one of the external apparatuses through two or more different links, the one external apparatus as the transmission source of the two or more frames; and
deciding a priority, in terms of communication connection, for the plurality of external apparatuses based on communication states of the two or more frames.

* * * * *